United States Patent [19]

Ogawa et al.

[11] 4,397,482
[45] Aug. 9, 1983

[54] CONSTRUCTION OF SASH ANCHOR

[75] Inventors: Hisashi Ogawa, Okazaki; Yoshikazu Imai, Toyota, both of Japan

[73] Assignee: Toyota Jidosha Kogyo Kabushiki Kaisha, Toyota, Japan

[21] Appl. No.: 258,803

[22] Filed: Apr. 29, 1981

[30] Foreign Application Priority Data

May 15, 1980 [JP] Japan .............................. 55-66853[U]

[51] Int. Cl.³ ............................................... B60R 21/10
[52] U.S. Cl. ...................................... 280/802; 297/468
[58] Field of Search ....................... 280/802, 803, 808; 297/468, 483

[56] References Cited

U.S. PATENT DOCUMENTS

| | | | |
|---|---|---|---|
| 4,040,645 | 8/1977 | Giffen | 280/803 |
| 4,189,169 | 2/1980 | Meuser | 280/802 |
| 4,220,353 | 9/1980 | Maekawa | 280/808 |
| 4,245,856 | 1/1981 | Ziv | 280/802 |
| 4,262,932 | 4/1981 | Motonami | 280/802 |
| 4,322,095 | 3/1982 | Takizawa | 280/802 |

Primary Examiner—David M. Mitchell
Assistant Examiner—John A. Carroll
Attorney, Agent, or Firm—Parkhurst & Oliff

[57] ABSTRACT

Construction of an anchor sash for use in a seatbelt system in which one end of an occupant restraining webbing is secured to a door and the webbing is automatically placed over an occupant in accordance with the opening and closing of the door. An anchor plate secured to one end of the webbing is in turn secured to a support base portion obtained by deforming a door sash and extends into a compartment of the vehicle, whereby the door sash has a satisfactorily mechanical strength despite the door sash has a small outside dimension. The anchor plate is supported to the vehicle body by a combination of an anchor pin having an enlarged head and a bracket having a receiving groove being open in the outward direction of the vehicle.

6 Claims, 8 Drawing Figures

CONSTRUCTION OF SASH ANCHOR

BACKGROUND OF THE INVENTION

1. Field of the Invention

This invention relates to construction of a sash anchor in a seatbelt system for supporting on a door frame an occupant restraining webbing for use in a seatbelt system for protecting an occupant in an emergency of a vehicle.

2. Description of the Prior Art

There has been proposed an automatic seatbelt system capable of automatically placing a webbing over a occupant upon his entering a vehicle. In the seatbelt system of the type described, one end of the occupant restraining webbing is engaged with a door, and, when the occupant opens or closes the door to enter or leave the vehicle, the intermediate portion of the webbing moves in the longitudinal direction of the vehicle in accordance with the opening or closing circularly arcuate motion of the door, so that a space for allowing the occupant to enter or leave the vehicle can be formed between a seat and the webbing.

In the automatic seatbelt system as described above, in order to impart to a door a tension generated in the webbing due to an inertial force of the occupant in an emergency of the vehicle, it is necessary to make construction of the door rigid to secure the restrained condition of the occupant.

However, if construction of the door is designed to be rigid, then there are presented such disadvantages that a door frame is increased in outside dimension to narrow the visual range of the occupant in the lateral direction and the weight of the vehicle is increased.

SUMMARY OF THE INVENTION

The present invention has been developed to obviate the abovedescribed disadvantages and has as its object the provision of construction of a sash anchor in a seatbelt system capable of making the width of the door frame small and making the sash anchor reliably support a tension generated in the webbing in an emergency of the vehicle.

According to the present invention, the sash anchor for a seatbelt system is constructed such that part of a door window frame is extended into the compartment to form a support base portion, and an anchor plate, with which the webbing is engaged, is secured to this support base portion, so that the webbing can be engaged with the door frame without increasing the outside dimension of the door frame. And, an enlarge head of an anchor pin projected from the anchor plate is located in a receiving groove of a bracket provided on a vehicle body, and this receiving groove is made to be open outwardly from the vehicle, whereby the enlarged head of the anchor pin is received by the receiving groove, when the door is closed, to prevent the enlarged head from moving forwardly in the vehicle. As a result, the tension generated in the webbing can be imparted to and reliably supported by the vehicle body.

Description will hereunder be given of an embodiment of the present invention with reference to the drawings.

DESCRIPTION OF THE PREFERRED EMBODIMENT

Figure 1:
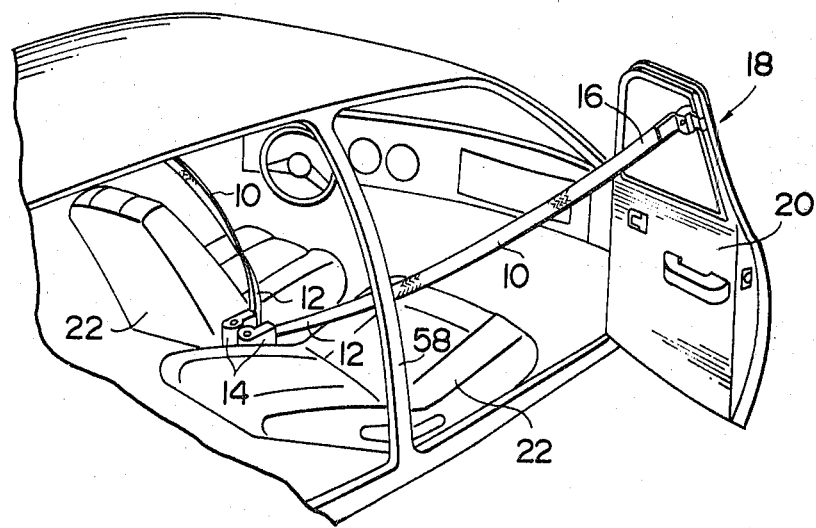
FIG. 1 is a perspective view of the state of the door being opened, showing a seatbelt system to which is applied the construction of the sash anchor for a seatbelt system according to the present invention.

FIG. 1 shows an embodiment in which the construction of the sash anchor according to the present invention is applied to a two-point seatbelt system. More particularly, an inner end portion 12 of an occupant restraining webbing 10 is wound into a retractor 14 provided at the substantially central portion of the vehicle by a biasing force. This reactor 14 incorporates therein an inertia lock mechanism for suddenly preventing the webbing 10 from unwinding in an emergency of the vehicle.

An outer end portion 16 of the webbing 10 is engaged with a door 20 through the construction of the sash anchor 18. If the occupant opens the door 20, then a space for allowing the occupant to enter the vehicle is formed between a seat 22 and the webbing 10. If the occupant closes the door 20 upon his entering the vehicle, then the webbing 10 is automatically placed over the occupant, so that he can be brought into a two-point seatbelt fastened condition.

Figure 2:
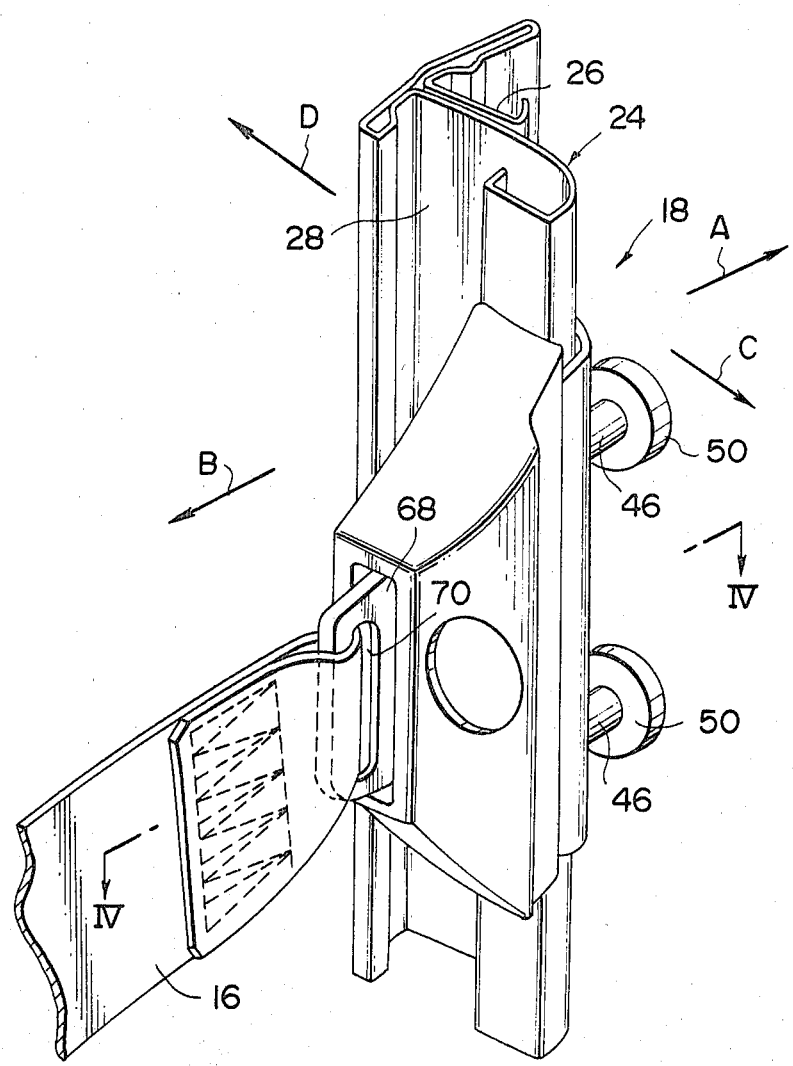
FIG. 2 is an enlarged perspective view of the state of the door being opened, showing the construction of the sash anchor.
Figure 3:
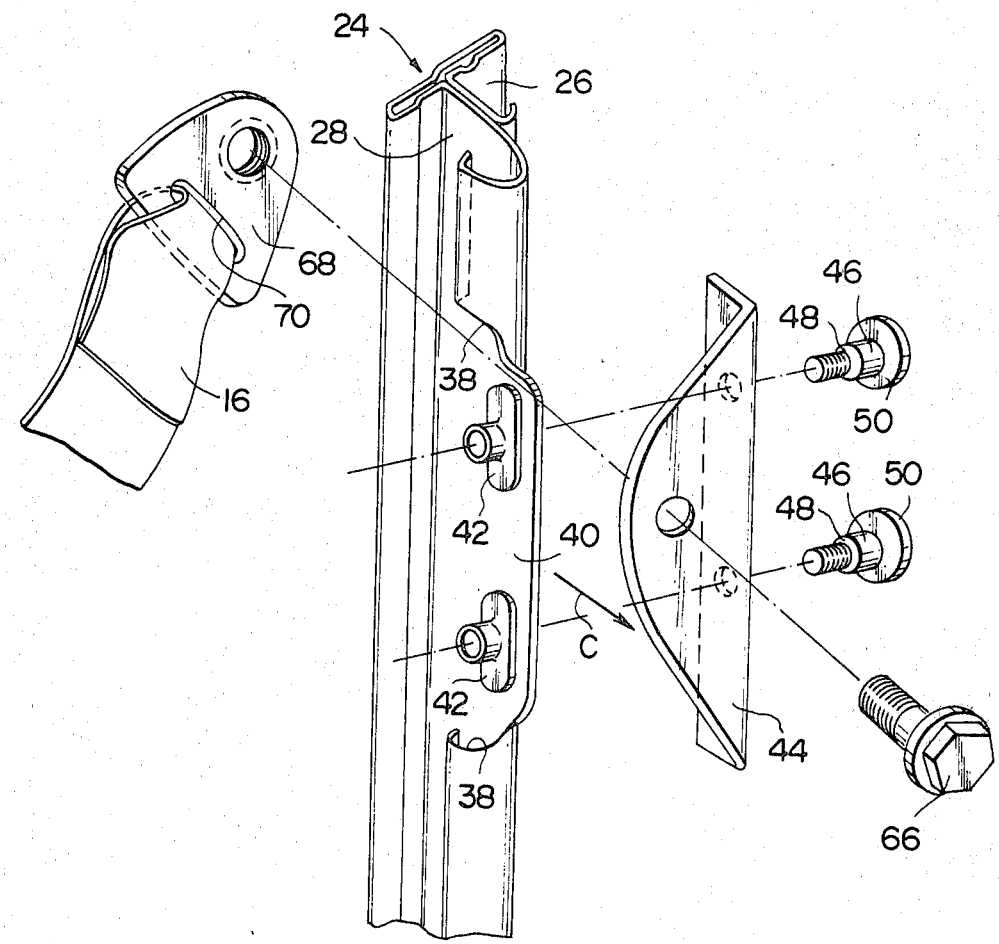
FIG. 3 is a disassembled perspective view of FIG. 2.
Figure 4:
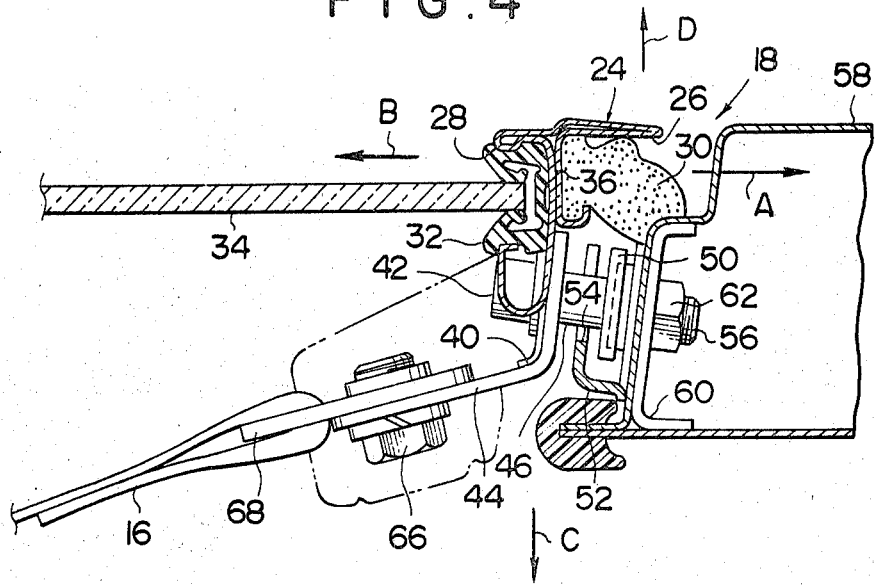
FIG. 4 is a sectional view of the state of the door being opened, corresponding to a sectional view taken along the line IV—IV in FIG. 2.

More detailed description will now be given of the construction of the sash anchor 18. As shown in FIGS. 2 through 4, a door window frame 24 of the door 20 is constructed such that a thin sheet is bent to provide a pair of substantially U-shaped portions 26 and 28 which are integral with each other. The U-shaped portion 26 is open in the rearward direction of the vehicle as indicated by arrow A to receive a weather strip 30, while the U-shaped portion 28 is open in the forward direction of the vehicle as indicated by arrow B to receive a glass run 32. The glass run 32 receives therein the end portion of a window pane 34, which is raised or lowered. The intermediate portions of these U-shaped portions 26 and 28 are solidly secured to each other by welding 36.

As shown in FIG. 3, the U-shaped portion 28 is provided at the intermediate portion thereof with a pair of shorn portions 38 at a predetermined interval. A section defined by those shorn portions which is formed by shaving is extended rectilinearly into the compartment as indicated by arrow C to provide a support base 40. A pair of T-shaped nuts 42 are welded to the surface of the support base 40 on the front side of the vehicle. One side of an L-shaped anchor plate 44 is closely attached to the surface of this support base 40 on the rear side of the vehicle. Anchor pins 46 extend through this anchor plate 44 and the support base 40 from the rear side of the vehicle and are threadably coupled to the T-shaped nuts 42, whereby the anchor plate 44 is solidly secured to the support base 40.

Each of these anchor pins 46 is provided at the intermediate portion thereof with a stepped portion 48, which is adapted to press the anchor plate 44 against the support base 40 when the anchor pins 46 are threadably coupled to the T-shaped nut 42. Furthermore, the forward end of this anchor pin 46 is formed into a large diameter enlarged head 50 opposed to a U-shaped groove 54 of a bracket 52.

Figure 5:
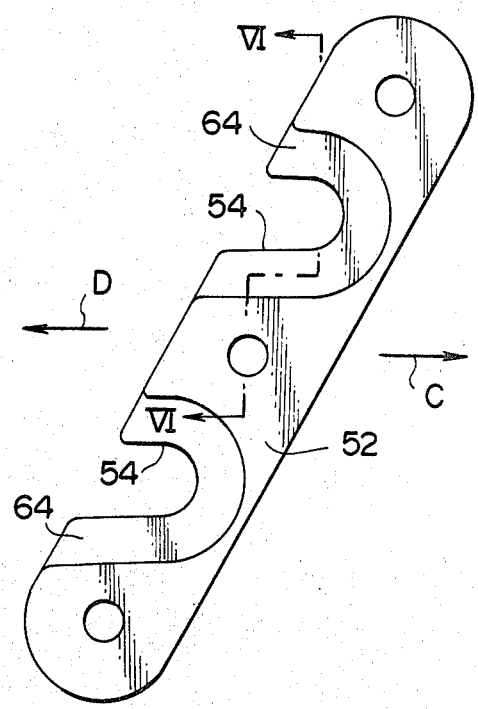
FIG. 5 is a front view showing the bracket.
Figure 6:
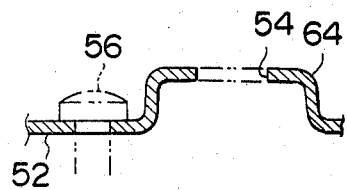
FIG. 6 is a sectional view taken along the line VI—VI in FIG. 5.

As shown in FIGS. 4 and 5, a bolt 56 is extended through a reinforcement 60 solidly secured to the interior of a center pillar and threadably coupled to a welded nut 62, whereby the bracket 52 is fixed onto the surface of the center pillar 58 directed to the front of the vehicle. The bracket 52 is provided at the intermediate portion thereof with raised portions 64 raised toward the front of the vehicle. Each of these raised portions 64 is provided with a U-shaped groove 54. These U-shaped groove 54 are open in the outward direction of the vehicle as indicated by arrow D, and, when the door 20 is closed, the intermediate portons of the anchor pins 46 are inserted through the U-shaped groove 54, whereby the enlarged head 50 is inserted into the raised portion 64. Here, the width of U-shaped groove 54 is larger than the diameter of the intermediate portion of the anchor pin 46, but smaller than the diameter of the enlarged head 50, whereby the U-shaped grooves 54 prevent the anchor pins 46 from moving forward in the state of the door being closed as shown in FIG. 4.

A connecting bolt 66 is extended through the other side of the L-shaped anchor plate 44 and threadably coupled to a second anchor plate 68. An outer end portion 16 of the webbing 10 is turned around at a slot 70 of the second anchor plate 68 and sewn onto itself, to thereby engage the outer end portion with the second anchor plate 68.

In this embodiment with the abovedescribed arrangement, if the occupant opens the door to enter the vehicle, then the webbing 10 moves in the forward direction of the vehicle in accordance with the opening circularly arcuate motion of the door as shown in FIG. 1, whereby the webbing 10 forms a space for allowing the occupant to enter the vehicle between the seat 22 and itself, so that the occupant can easily sit on the seat. If the occupant closes the door after he sat on the seat, then the remaining portion of the webbing 10 is wound into the retractor 14 and the webbing 10 moves in the rearward direction of the vehicle, whereby the webbing 10 is automatically placed over the occupant. As a result the occupant can be brought into a two-point seat-belt fastened condition.

When the door is closed, the anchor pins 46 are inserted through the U-shaped grooves 54 of the bracket 52 and the enlarged heads 50 are inserted into the raised portion of the bracket 52, respectively.

During normal running condition of the vehicle, the retractor 14 can unwind the inner end portion 12 of the webbing 10, so that the occupant can desirably change his driving posture. However, in an emergency of the vehicle such as a collision, the inertia lock mechanism of the retractor 14 suddenly prevents the unwinding of the inner end portion 12 of the webbing 10, whereby the occupant, who is violently thrown in the direction of the collision, generates a high tension in the webbing. This tension of the webbing 10 is imparted to the anchor pins 46 through the outer end portion 16 of the webbing 10, and anchor plates 68 and 44. Since the enlarged heads 50 of these anchor pins 46 are prevented from passing through the U-shaped grooves 54, the enlarged heads 50 engage the raised portions 64 of the bracket 52 to prevent the outer end portion 16 of the webbing 10 from moving in the forward direction of the vehicle when the tension of the webbing 10 is increased.

With the abovedescribed arrangement, the outer end portion 16 of the webbing 10 reliably imparts the tension generated in the webbing 10 to the center pillar 58 and the inner end portion 12 imparts the tension in the webbing 10 to the vehicle body, so that the occupant can be positively restrained by the webbing 10, thereby securing the occupant safely.

Figure 7:
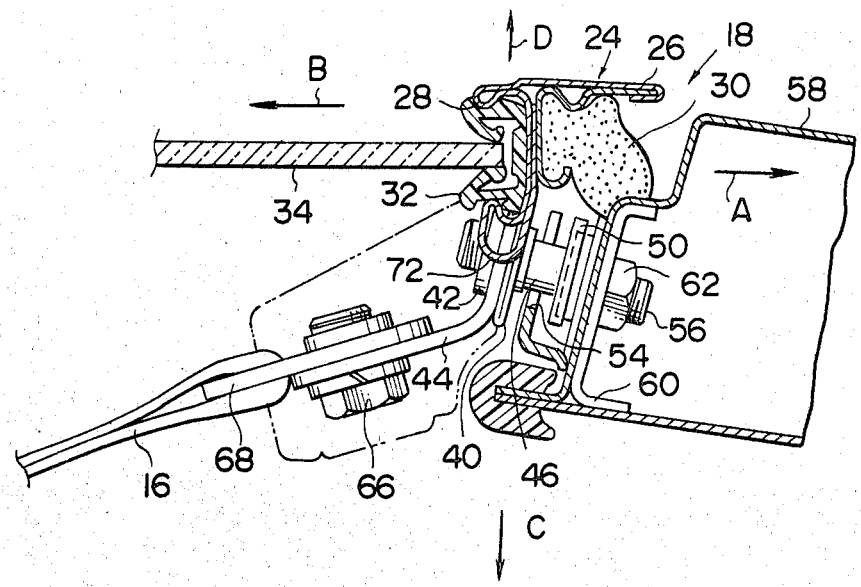
FIGS. 7 and 8 sectional views showing a second and a third embodiments of the present invention, corresponding to FIG. 4.
Figure 8:
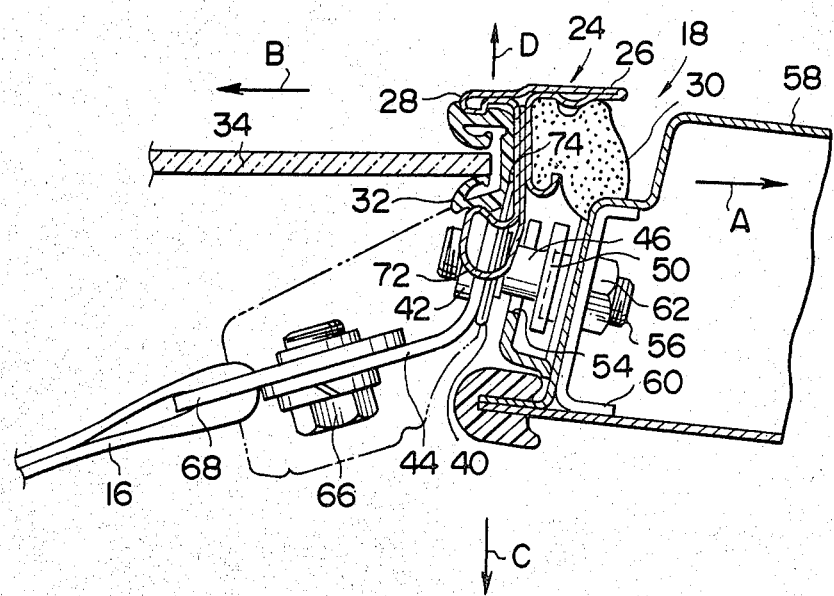

FIGS. 7 and 8 show a second and a third embodiments of the present invention, in both of which a portion of the window frame 24 is pressed flat and extended into the compartment to provide the support base 40 for securing the anchor plate 44 to the center pillar 58. More specifically, part of a U-shaped portion 28 adjacent at its end in the compartment is bent at a predetermined curvature to provide a bulged-out portion 72 which increases the mechanical strength of the window frame 24, and part of this bulged-out portion 72 is pressed flat as if it has been subjected to pressures from front and back of the vehicle to provide a support base 40.

In this support base 40, the thin sheet constituting the window frame is double-folded, so that the mechanical strength can be increased as compared with the preceding embodiment.

An L-shaped anchor plate or a connecting member 44 is disposed at a side of the support base 40 forwardly in the vehicle and fastened to the support base 40 through the nut 42 and the anchor pin 46.

The support base 40 shown in FIG. 8 is provided at a portion thereof connected to the U-shaped portion 28 with a stepped portion 74, whereby the support base 40 is disposed slightly more forwardly in the vehicle than the preceding embodiment. Therefore, the degree of projection of the anchor pin 46 from the window frame 24 is decreased and the mechanical strength is increased as compared with the preceding embodiments.

Additionally, in the abovedescribed embodiments, although description has been given to the case where the tension of the webbing is imparted through the anchor plates 68 and 44, these anchor plate may be formed into a single anchor plate. Furthermore, the anchor pin 46 is constructed such that it secures the L-shaped anchor plate 44 to the window frame 24 and performs a function of imparting the tension of the webbing to the center pillar, however, needless to say, another bolt may be used for securing the anchor plate to the window frame.

As has been described hereinabove, according to the present invention, the sash anchor for the seatbelt system is of such an arrangement that the support base portion for supporting the anchor plate is formed in order to project into the compartment from the door window frame whereby the door window frame is not made large in outside dimension. Additionally, only a slight modification to the conventional door window frame can make the outer end portion of the webbing engageable with the door frame. Furthermore, the anchor pin connected to the anchor plate is caused to linearly go into and out of the receiving groove of the bracket secured to the vehicle body in accordance with the opening or closing of the door, so that such an outstanding advantage can be offered that the tension generated in the webbing can be reliably imparted to the vehicle body in an emergency of the vehicle.

What is claimed is:

1. In combination with a passenger compartment of a vehicle a sash anchor for supporting an occupant restraining webbing for use in a seatbelt system in which said webbing is moved in the longitudinal direction of said vehicle in accordance with the opening or closing of a door to thereby automatically place the webbing over an occupant in the passenger compartment of the vehicle, comprising:
   (a) a door window frame defining a door sash, said door sash comprising a pair of U-shaped portions directed to the front and back of the vehicle respectively, wherein a portion of said U-shaped portion directed toward the front of the vehicle is shaved-up and extends rectilinearly into the passenger compartment to form a shorn portion;
   (b) an anchor plate engaged at a portion thereof with the occupant restraining webbing and secured to said shorn portion;
   (c) an anchor pin for securing the anchor plate to the shorn portion and extending rearwardly of the vehicle, said anchor pin having an enlarged head; and
   (d) a bracket provided on a center pillar defining a vehicle body and provided with a receiving groove being open outwardly in a widthwise direction of the vehicle for receiving an intermediate portion of said anchor pin and engaging with said enlarged head to prevent said anchor pin from moving forwardly in the vehicle when the door is closed, whereby in an emergency in the vehicle, said bracket receives a tension generated in the webbing through said anchor plate and said anchor pin and imparts the tension to the vehicle body.

2. The combination as set forth in claim 1, wherein said anchor pin is a bolt threadably coupled to said shorn portion.

3. The combination as set forth in claim 1, further comprising a glass run for guiding a window pane, said glass run being inserted in the U-shaped portion directed to the front of the vehicle, and a weather strip for sealing a space formed between the door sash and the center pillar, said weather strip being inserted in the U-shaped portion directed to the back of the vehicle.

4. The combination as set forth in claim 1, wherein a portion of the door sash is pressed flat by pressures applied thereto from the front and back of the vehicle to provide double wall construction.

5. The combination as set forth in claim 4, further comprising a mounting portion for said anchor plate, said mounting portion being disposed forwardly in the vehicle through a stepped portion provided at an intermediate portion of said shorn portion.

6. In combination with a vehicle passenger compartment a door sash anchor for use in a seatbelt system for automatically placing a webbing over an occupant in the vehicle passenger compartment, comprising:
   (a) a retractor provided at the substantially central portion of the vehicle passenger compartment;
   (b) an occupant restraining webbing, one end of which is wound into said retractor;
   (c) an anchor plate provided at the other end of said webbing;
   (d) a support base portion for mounting said anchor plate, said support base portion being a shaved-up portion defined by a pair of shorn portions in a U-shaped portion of the door sash, said shorn portions extending rectilinearly into the vehicle passenger compartment;
   (e) an anchor pin with an enlarged head, for securing said anchor plate to said shorn portion;
   (f) a bracket secured to a center pillar of the vehicle, being open to the outward direction of the vehicle, receiving an intermediate portion of said anchor pin when the door is closed, and being engaged with said enlarged head to prevent said anchor plate from moving forwardly in the vehicle in an emergency in the vehicle.

* * * * *